(12) United States Patent
Triscari et al.

(10) Patent No.: US 11,098,755 B2
(45) Date of Patent: Aug. 24, 2021

(54) HYDRODYNAMIC BEARING SYSTEM AND METHOD FOR OPERATING SAID HYDRODYNAMIC BEARING SYSTEM

(71) Applicant: GE Precision Healthcare LLC, Milwaukee, WI (US)

(72) Inventors: Andrew Triscari, Hubertus, WI (US); Ian Hunt, Bountiful, UT (US)

(73) Assignee: GE PRECISION HEALTHCARE LLC, Milwaukee, WI (US)

( * ) Notice: Subject to any disclaimer, the term of this patent is extended or adjusted under 35 U.S.C. 154(b) by 0 days.

(21) Appl. No.: 16/776,099

(22) Filed: Jan. 29, 2020

(65) Prior Publication Data
US 2021/0231167 A1 Jul. 29, 2021

(51) Int. Cl.
*F16C 17/10* (2006.01)
*H01J 35/10* (2006.01)

(52) U.S. Cl.
CPC .......... *F16C 17/107* (2013.01); *H01J 35/104* (2019.05); *F16C 2316/10* (2013.01); *F16C 2380/16* (2013.01)

(58) Field of Classification Search
CPC ........ F16C 17/02; F16C 17/026; F16C 17/10; F16C 17/102; F16C 17/107; F16C 17/26; F16C 2316/10; F16C 2380/16; H01J 35/1017; H01J 35/104
See application file for complete search history.

(56) References Cited

U.S. PATENT DOCUMENTS

| | | | |
|---|---|---|---|
| 2,352,469 A | 6/1944 | Carlson | |
| 3,063,041 A * | 11/1962 | Quade | F16C 41/00 360/71 |
| 7,046,766 B2 * | 5/2006 | Bathe | F16C 17/102 378/132 |
| 7,050,451 B2 | 5/2006 | Bittl | |
| 8,964,941 B2 | 2/2015 | Onken | |
| 9,500,226 B2 * | 11/2016 | Hunt | F16C 33/1065 |

FOREIGN PATENT DOCUMENTS

CN 102822543 A 12/2012

OTHER PUBLICATIONS

Hattori, H. et al., "Proposal of a High Rigidity and High Speed Rotating Mechanism Using a New Concept Hydrodynamic Bearing in X-Ray Tube for High Speed Computed Tomography," Journal of Advanced Mechanical Design, Systems, and Manufacturing, vol. 3, No. 1, Available as Early as Jan. 2009, 10 pages.

* cited by examiner

*Primary Examiner* — James Pilkington

(57) ABSTRACT

Systems and methods related to hydrodynamic bearings are provided. One example hydrodynamic bearing system includes a sleeve assembly including a cross-member fluidically dividing a first interior cavity from a second interior cavity, a first shaft positioned in the first interior cavity, and a second shaft positioned in the second interior cavity. The hydrodynamic bearing system further includes a first journal bearing including a first fluid interface surrounding at least a portion of the first cantilever shaft and configured to support radial loads and a second journal bearing including a second fluid interface surrounding at least a portion of the second cantilever shaft and configured to support radial loads.

18 Claims, 3 Drawing Sheets

HYDRODYNAMIC BEARING SYSTEM AND METHOD FOR OPERATING SAID HYDRODYNAMIC BEARING SYSTEM

TECHNICAL FIELD

Embodiments of the subject matter disclosed herein relate to hydrodynamic bearing systems and methods for operating hydrodynamic bearing systems.

BACKGROUND

Hydrodynamic bearings are used in various operating environments due to their increased longevity and ability to more effectively manage thermal loads, relative to ball bearings or roller bearings. One such operating environment is the use of hydrodynamic bearings in x-ray tubes of x-ray imaging systems or computed tomography (CT) imaging systems. Certain x-ray tubes, for example, utilize hydrodynamic bearings owing at least in part to their thermodynamic characteristics and durability. However, certain hydrodynamic bearings may experience leaks due to the bearing's boundary conditions and/or may not achieve a desired load carrying capacity. Hydrodynamic bearings may also be known as liquid metal bearings or spiral groove bearings.

SUMMARY

In one embodiment, a hydrodynamic bearing system is provided. The hydrodynamic bearing system comprises a sleeve assembly including a cross-member fluidically dividing a first interior cavity from a second interior cavity. The hydrodynamic bearing system further includes a first shaft positioned in the first interior cavity and a second shaft positioned in the second interior cavity. The hydrodynamic bearing system also includes a first journal bearing having a first fluid interface surrounding at least a portion of the first shaft and configured to support radial loads and a second journal bearing having a second fluid interface surrounding at least a portion of the second shaft and configured to support radial loads.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

The following description relates to various embodiments of hydrodynamic bearing systems. The hydrodynamic bearing systems are designed to fix axial fluid boundary conditions at selected ends of discrete shafts enclosed by different sections of a sleeve. Increased bearing stability and working fluid (e.g., liquid metal) control and a subsequent bearing leak reduction result from the fixed axial fluid boundary conditions. Thus, the bearing leaks may be reduced across different stages of the system (e.g., handling, processing, and operation). To achieve the fixed boundary conditions the sleeve includes a cross-member dividing the sleeve into the two distinct cavities. Further, in certain system embodiments, the shafts are cantilever shafts supported at one end by, for example, a housing of the system. In this way, the structural support of straddle type bearings can be achieved while reducing the hydrodynamic drawbacks of previous straddle bearing designs, thereby expanding the applicability of the bearing system. As such, in one use-case example, the bearing system may be deployed in computed tomography (CT) imaging systems having higher gantry loads in comparison to CT imaging systems with x-ray sources supporting a fixed bearing shaft on only one axial end. Providing two cantilever shafts also decreases focal spot motion in x-ray sources employing the bearing system in relation to systems using one cantilever shaft. In additional examples, the cross-member may be designed with a targeted amount of compliance to reduce sleeve-shaft misalignment. As a result, the thickness of the fluid interface in the bearing may be reduced, if desired, thereby increasing the bearing's load carrying capacity and efficiency.

Figure 1:
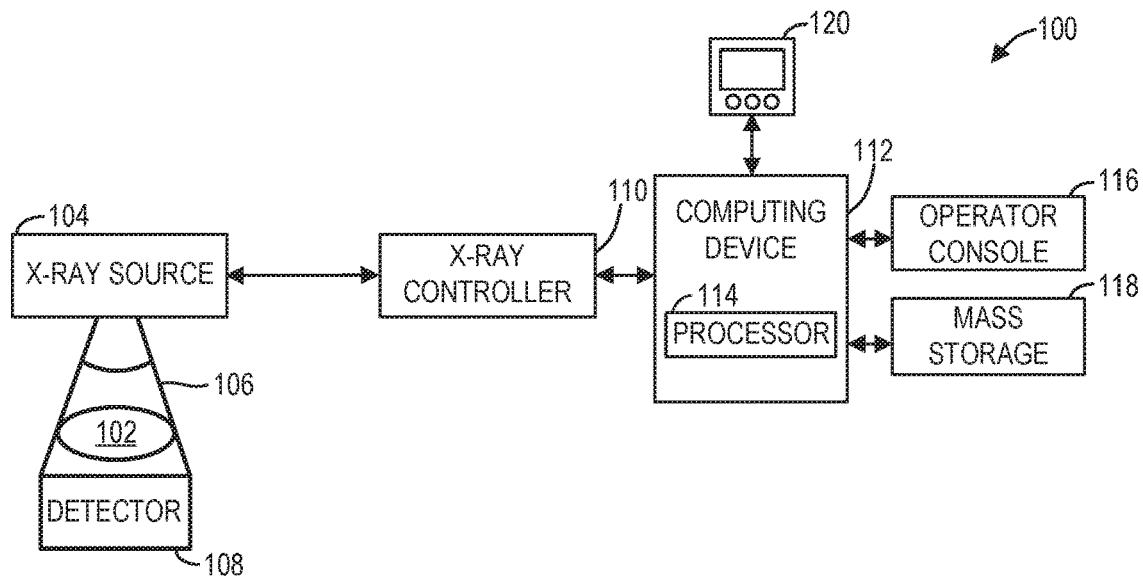
FIG. 1 is a block schematic diagram of an exemplary x-ray imaging system, according to an embodiment.
Figure 2:
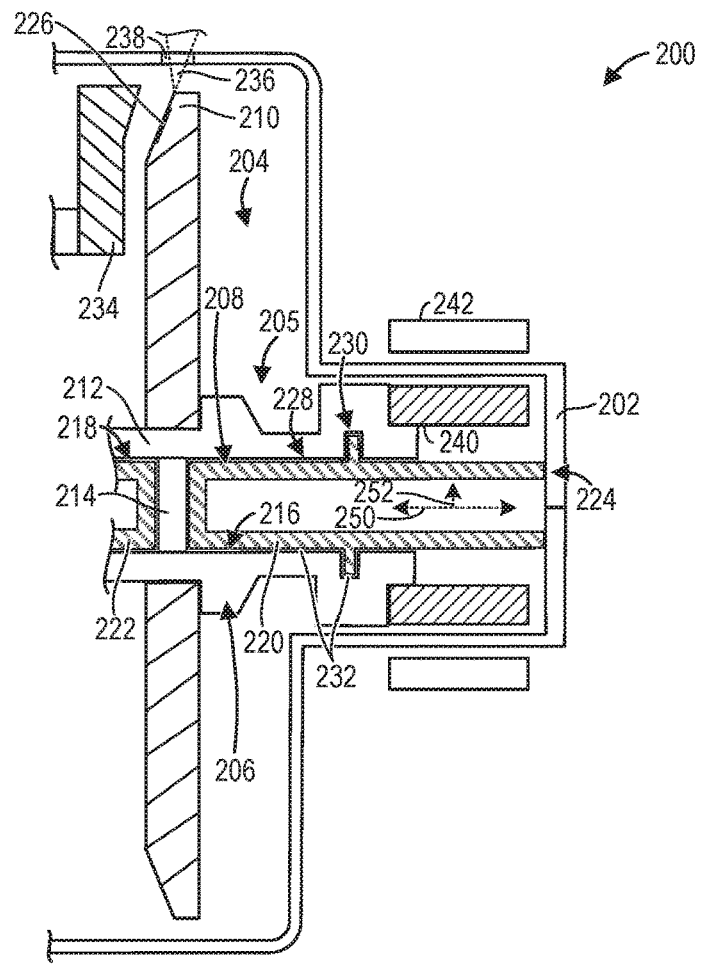
FIG. 2 is a pictorial view of a portion of an x-ray source including a hydrodynamic bearing system, according to an embodiment.
Figure 3:
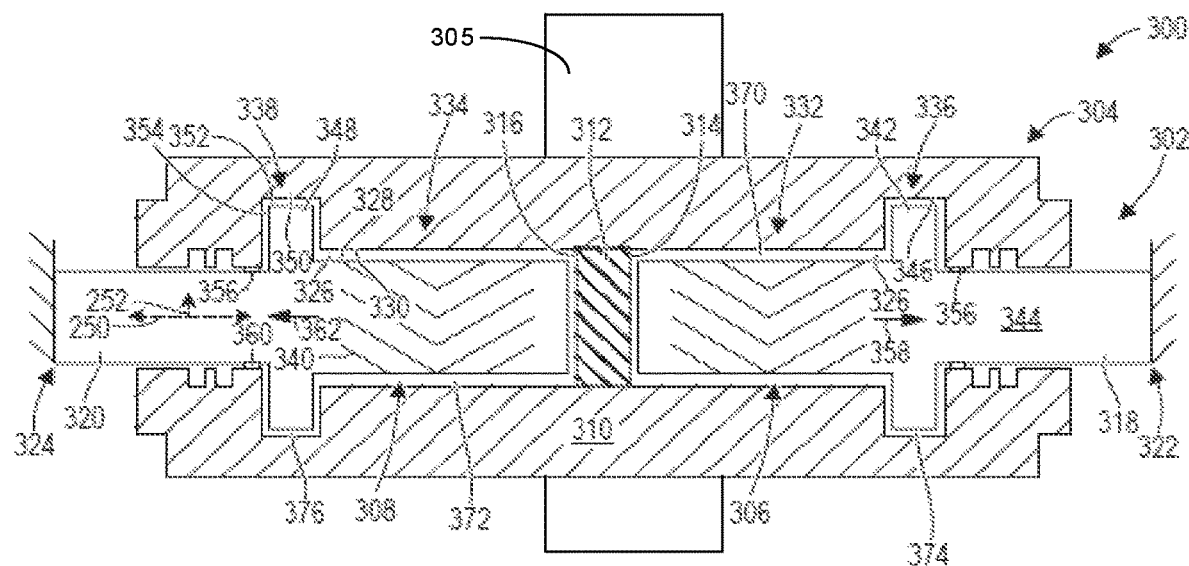
FIG. 3 is a first exemplary hydrodynamic bearing assembly, according to an embodiment.
Figure 4:
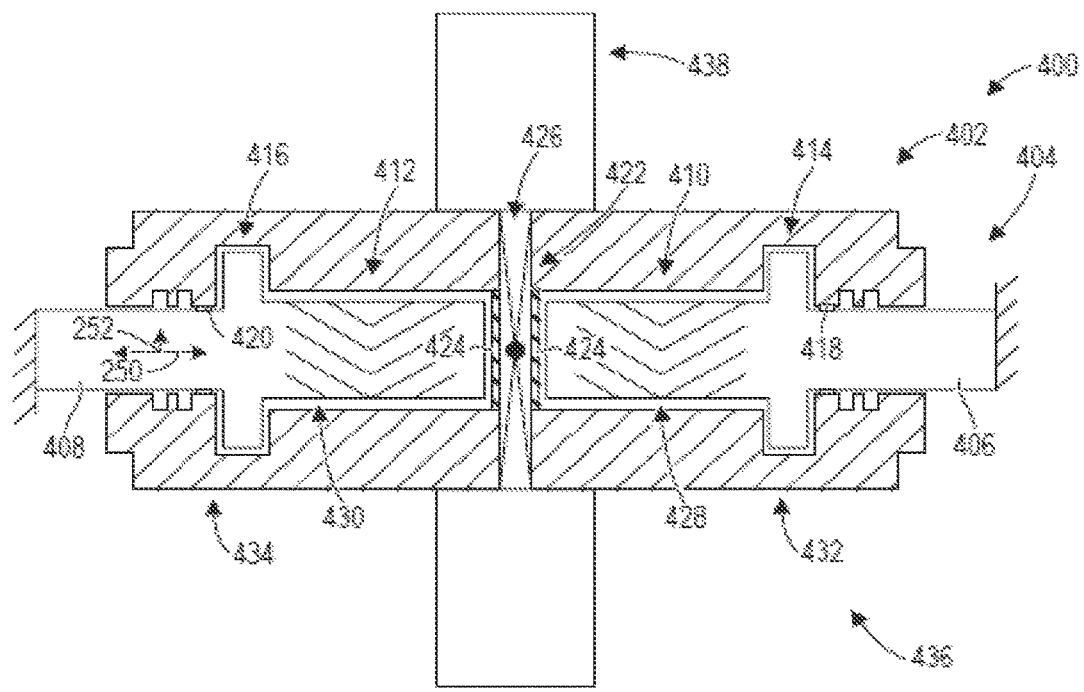
FIG. 4 is a second exemplary hydrodynamic bearing assembly, according to an embodiment.
Figure 5:
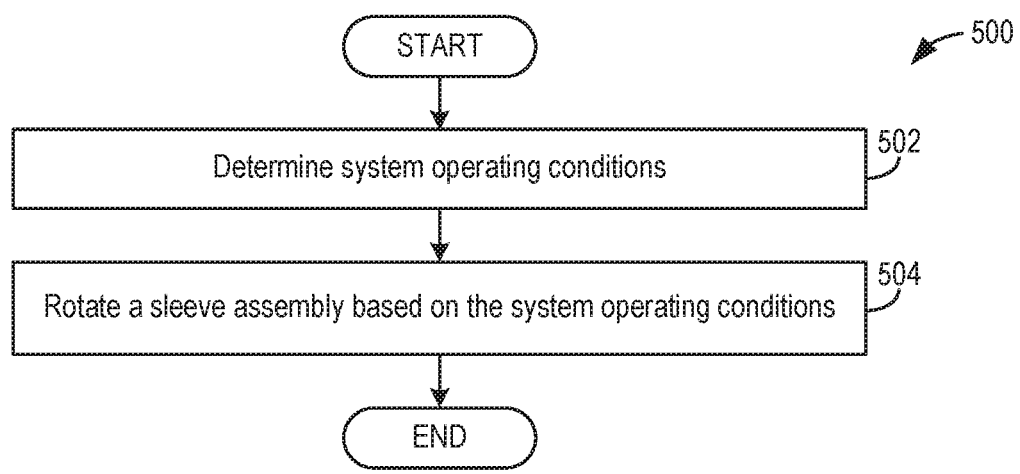
FIG. 5 is an exemplary method for operation of a hydrodynamic bearing system, according to an embodiment.

An x-ray imaging system including an x-ray source and x-ray controller is shown in FIG. 1. An example of an x-ray imaging system is shown in FIG. 2 with a hydrodynamic bearing assembly enabling anode rotation. FIG. 3 shows a first embodiment of a hydrodynamic bearing system. FIG. 4 shows a second embodiment of a hydrodynamic bearing system with a flexible cross-member enabling sleeve-shaft misalignment to be reduced. FIG. 5 shows a method for operation of a hydrodynamic bearing system.

FIG. 1 illustrates an x-ray imaging system 100 designed to generate x-rays. The x-ray imaging system 100 is configured as an imaging system (e.g., CT imaging system, radiography imaging system, fluoroscopy imaging system, tomography imaging system, etc.) in FIG. 1. However, the x-ray imaging system 100 has applicability to fields beyond imaging, medical devices, and the like. For instance, the x-ray imaging system 100 may be deployed in crystallography systems, security scanners, x-ray photography systems, etc. It will also be appreciated that the hydrodynamic bearing systems described in greater detail herein may be deployed in alternate types of systems utilizing hydrodynamic bearings, in some instances. Hydrodynamic bearing systems may also be known as liquid metal bearing systems or spiral groove bearing systems, etc.

In the imaging system example, the imaging system may be configured to image a subject 102 such as a patient, an inanimate object, one or more manufactured parts, and/or foreign objects such as dental implants, stents, and/or contrast agents present within the body.

The x-ray imaging system 100 may include at least one x-ray source 104 configured to project a beam of x-ray radiation 106. Specifically, in the illustrated embodiment, the x-ray source 104 is configured to project x-ray radiation beams 106 towards a detector array 108 and through the subject 102. In some system configurations, the x-ray source 104 may project a cone-shaped x-ray radiation beam which is collimated to lie within an X-Y-Z plane of a Cartesian coordinate system. However, other beam profiles and/or systems omitting the detector array have been envisioned. Each detector element of the array produces a separate electrical signal that is a measurement of the x-ray beam attenuation at the detector location.

Although FIG. 1 depicts only a single x-ray source 104 and detector array 108, in certain embodiments, multiple x-ray sources and/or detectors may be employed to project a plurality of x-ray radiation beams and detect said beams. For instance, in the CT imaging system use-case example, multiple detectors may be used in tandem with multiple x-ray sources to acquire projection data at different energy levels corresponding to the subject.

The x-ray imaging system 100 may further include an x-ray controller 110 configured to provide power and timing signals to the x-ray source 104. It will be understood that that system may also include a data acquisition system configured to sample analog data received from the detector elements and convert the analog data to digital signals for subsequent processing.

In certain embodiments, the x-ray imaging system 100 may further include a computing device 112 having a processor 114 and controlling system operations based on operator input. The computing device 112 receives the operator input, for example, including commands and/or scanning parameters via an operator console 116 operatively coupled to the computing device 112. The operator console 116 may include a keyboard, a touchscreen, and/or other suitable input device allowing the operator to specify the commands and/or scanning parameters.

Although FIG. 1 illustrates only one operator console 116, more than one operator console may be included in the x-ray imaging system 100, for example, for inputting or outputting system parameters, requesting examinations, plotting data, and/or viewing images. Further, in certain embodiments, the x-ray imaging system 100 may be coupled to multiple displays, printers, workstations, and/or similar devices located either locally or remotely, for example, and connected via wired and/or wireless networks.

In one example, the computing device 112 stores the data in a storage device or mass storage 118. The storage device 118, for example, may include a hard disk drive, a floppy disk drive, a compact disk-read/write (CD-R/W) drive, a Digital Versatile Disc (DVD) drive, a flash drive, and/or a solid-state storage drive.

Additionally, the computing device 112 provides commands to the x-ray controller 110 and other system components for controlling system operations such as x-ray beam formation, data acquisition and/or processing, etc. Thus, in certain embodiments, the computing device 112 controls system operations based on operator input. To elaborate, the computing device 112 may use the operator-supplied and/or system-defined commands and parameters to operate an x-ray controller 110, which in turn, may control the x-ray source 104. In this way, the intensity and timing of x-ray beam generation may be controlled. It will also be understood that the rotational speed of a sleeve in the x-ray source may be adjusted by the computing device 112 in conjunction with the x-ray controller 110. The rotational speed adjustment of the sleeve may induce the flow of liquid metal into a bearing interface in the x-ray source 104, as described in greater detail herein.

The various methods and processes (such as the method described below with reference to FIG. 5) described further herein may be stored as executable instructions in non-transitory memory on a computing device (or controller) in x-ray imaging system 100. In one embodiment, the x-ray controller may include the executable instructions in non-transitory memory, and may apply the methods described herein to control the x-ray source. In another embodiment, computing device 112 may include the instructions in non-transitory memory, and may relay commands, at least in part, to the x-ray controller which in turn adjusts the x-ray source output.

In one embodiment, a display 120 may also be in electronic communication with the computing device 112 and is configured to display graphical interfaces indicating system parameters, control setting, imaging data, etc.

FIG. 2 shows a detailed embodiment of a portion of an x-ray source, such as an x-ray tube 200. The x-ray source 200 shown in FIG. 2 serves as an example of the x-ray source 104 depicted in FIG. 1. As such, the x-ray source 200, shown in FIG. 2, as well as the other x-ray imaging system embodiments described herein may include functional and/or structural features from the x-ray source 104, shown in FIG. 1, or vice versa. Furthermore, alternate embodiments combining features from one or more of the systems have also been envisioned.

A rotational axis 250 along with a radial axis 252 are provided in FIG. 2 as well as FIGS. 3-4 for reference. It will be understood that a radial axis is any axis perpendicular to the rotational axis 250.

The x-ray source 200 includes a housing 202 having a low-pressure enclosure 204 (e.g., vacuum enclosure) formed therein. It will be understood that a low-pressure enclosure infers a comparatively low-pressure relative to atmospheric pressure. As such, the pressure in the enclosure may be less than atmospheric.

The x-ray source 200 includes a hydrodynamic bearing system 205 with a sleeve assembly 206 and a shaft assembly 208. In the illustrated example, the sleeve assembly 206 is a rotational component and the shaft assembly 208 is a stationary component. However, embodiments in which the sleeve assembly is a stationary component and the shaft assembly is a rotational component, have been contemplated. In such an example, an anode 210 may be coupled to the shaft assembly 208 as opposed to the sleeve assembly 206. Nevertheless, in the illustrated embodiment, the anode 210 is coupled to the sleeve assembly 206. It will be understood that the motion denoted by the descriptors stationary and rotational denote the relative motion between the components. However, in certain use-case examples, the x-ray tube may be integrated into a moving structure. For instance, in the CT imaging system use-case, the x-ray tube may be integrated into a rotating gantry. As such, in smaller scale frame of reference, the shaft is stationary relative to the sleeve but in a larger scale frame of reference, both components exhibit similar rotational motion in the gantry. However, in alternate use-case scenarios, the x-ray tube may be integrated into a stationary structure in regard to the larger scale frame of reference.

The sleeve assembly 206 includes a sleeve body 212 and a cross-member 214 partitioning an interior of the body into a first interior cavity 216 and a second interior cavity 218.

Thus, the cross-member 214 fluidically divides interior sleeve cavities. The shaft assembly 208 includes a first shaft 220 residing in the first interior cavity 216 and a second shaft 222 residing in the second interior cavity 218. The first shaft 220 is shown fixedly coupled to the housing 202 at a first axial end 224 and unsupported at the opposing axial end. However, the first shaft 220 may be fixedly attached to another suitable stationary x-ray source component, in other examples. Although certain structural details of the second shaft 222 are obscured from view in FIG. 2, it will be appreciated that one axial end of the second shaft 222 may be coupled to the housing 202 or other suitable stationary component in the x-ray source. Thus, the bearing system may be formed as a straddle bearing system. Further, in other embodiments in which the shaft assembly rotates, the sleeve assembly may include two sleeve sections fixedly attached to the housing at an axial end of each section. The structural features of the sleeve and shaft assemblies are elaborated upon in greater detail herein with regard to the embodiments shown in FIGS. 3-4.

The cross-member 214 in the sleeve assembly 206 enables fluid boundary conditions on axial ends of each of the first and second shaft 220 and 222 to be fixed. Fixing the fluid boundary conditions at the axial ends of the shafts allows the stability and control of the fluid in the rotational interfaces in the hydrodynamic bearing system 205 to be increased in relation to systems using a single continuous shaft with a series of hydrodynamic bearings in fluidic communication with one another. Consequently, the likelihood of leaks from the hydrodynamic bearing system is reduced.

It will also be understood that the leak reductions may be achieved while jointly increasing load carrying capacity of the assembly via the cantilever attachment of both shafts. Providing two shafts in the shaft assembly 208 fixedly supported at one end, decreases unwanted motion of a focal spot 226 on the anode 210 during operation due to the increased bearing support in comparison to systems using a single cantilever shaft.

The structural and functional details of the cross-member 214 are expanded upon in greater detail herein with regard to the hydrodynamic bearing system embodiments illustrated in FIGS. 3-4. The sleeve assembly 206 includes structures designed fix the boundary conditions on axial ends of discrete shafts in the system while also fixedly attaching opposing axial ends of the shafts to stationary components in the system. Fixing the boundary conditions at ends of discrete shafts allows the liquid metal, or other suitable working fluid, to be stabilized such that leaks from the seals in the system are significantly reduced, in relation to systems using a series of hydrodynamic bearings in fluidic communication with one another.

The hydrodynamic bearing system 205 includes a plurality of hydrodynamic bearings including a journal bearing 228 and a thrust bearing 230. The system may however include additional bearings obscured from view in FIG. 2. For instance, in the embodiments shown in FIGS. 3-4, the system includes two journal bearings and two thrust bearing. Still further in other embodiments, the bearing system may include an alternate number and/or types of bearings. For instance, the system may include two journal bearing and one thrust bearing in one example, or more than two journal bearings and two thrust bearings, in other examples. The hydrodynamic journal bearing 228 is designed to support radial loads and hydrodynamic thrust bearing 230 is designed to support axial loads. In this way, loads on the sleeve are managed to enable efficient sleeve rotation.

Each of the bearings include an interface 232 in which a working fluid (e.g., liquid metal) serving as a lubricant and supporting loads is provided. The thickness of the interface may be selected based on factors such as the type liquid metal or other working fluid used in the bearing, manufacturing tolerances of the components, expected system operating temperature, etc. Thus, in one use-case example, the liquid metal interface may be on the order of 5 microns (μm)-40 μm. In one example, the liquid metal used as the working fluid in the bearing assembly may include gallium, tin, indium, combinations thereof, etc. However, working fluid other than liquid metal have been envisioned such grease, oil, combinations thereof, etc.

In the illustrated embodiment, the anode 210 is coupled to the sleeve assembly 206. However, as previously mentioned, embodiments with the anode coupled to rotational shaft assemblies have been envisioned. The anode 210 includes the focal spot 226 serving as a surface receiving a beam of electrons from a cathode 234, during x-ray source 200 operation.

The cathode 234 may receive signals from a controller, such as the x-ray controller 110 shown in FIG. 1, to generate an electron beam directed toward a surface of the anode 210. An x-ray beam 236 is generated when the electron beam from the cathode 234 strikes the focal spot 226 of the anode 210. The x-rays are emitted through an x-ray window 238 in the housing 202.

A rotor 240 and a stator 242 are also provided in the x-ray source 200. The rotor 240 is coupled to the sleeve assembly 206, in the illustrated embodiment, and is designed to impart rotational motion thereto. However, in embodiments where the shaft assembly rotates the rotor may be coupled to the first and second shafts in the shaft assembly. The stator 242 is shown positioned external to the low-pressure enclosure 204. However, other suitable stator locations have been envisioned. Typically, the rotor and stator can include windings, magnets, electrical connections, etc., electromagnetically interacting to generate rotor rotation responsive receiving control commands, from for example, the x-ray controller 110, shown in FIG. 1.

Various embodiments of the hydrodynamic bearing system designed to reduce leaks from bearings in the system, are described in greater detail herein with regard to FIGS. 3-4. The embodiments of the hydrodynamic bearing systems depicted in FIGS. 3-4 are examples of the hydrodynamic bearing system 205, shown in FIG. 2. As such, structural and/or functional features from the bearing systems shown in FIGS. 3-4 may be included in the bearing system 205, shown in FIG. 2, in other contemplated embodiments.

FIG. 3 shows an example of a hydrodynamic bearing system 300. The hydrodynamic bearing system 300 includes a shaft assembly 302 and a sleeve assembly 304. In one embodiment, an anode 305 (i.e., the anode 510 show in FIG. 2) is attached to the sleeve assemble. Thus, during system use, the sleeve assembly rotates while the shaft assembly remains relatively stationary. However, as previously mentioned, embodiments where the sleeve assembly is kept stationary and the shaft assembly rotates, have been envisioned.

The sleeve assembly 304 includes a first interior cavity 306 and a second interior cavity 308 formed in a sleeve body 310. The sleeve body 310 is shown as a monolithic structure. However, sleeves with different sections connected to one another may be used, in other embodiments. For instance, in other embodiments, the sleeve body may manufactured in different sections and the sections may be coupled via mechanical attachment (e.g., bolting), welding, press-fitting, shrink-fitting, combinations thereof, etc.

The sleeve assembly 304 further includes a cross-member 312 radially extending across an interior of the sleeve body 310. To elaborate, the cross-member 312 fluidly divides the first and second interior cavities 306, 308 in the sleeve assembly 304. The cross-member 312 therefore includes a first surface 314 forming a section of the boundary of the first interior cavity 306 and a second surface 316 forming a section of the boundary of the second interior cavity 308. Thus, the first interior cavity 306 and the second interior cavity 308 are conceptually formed as blind openings. A variety of cross-member constructions have been contemplated such as a construction where the cross-member is a plug inserted into the sleeve assembly. In such an example, the plug may be coupled to the sleeve body via press-fitting, welding, mechanical attachment, combinations thereof, etc. and/or may be formed as a cylinder. In other examples, the body and the cross-member of the sleeve assembly may be jointly formed via suitable manufacturing techniques such as machining, casting, etc. It will therefore be understood that the sleeve body 310 and the cross-member 312 may be formed from a similar material, in some examples, or out of different materials, in other examples. Suitable materials for the sleeve assembly 304 and/or shaft assembly 302 may include metallic materials, ceramic materials, combinations thereof, etc.

The cross-member 312 allows the fluid boundary conditions of the bearing interfaces, discussed in greater detail herein, to be fixed, increasing stability of fluid (e.g., liquid metal) capillary forces and pressure. Fluid leaks through seals 356 and 360 in the system can therefore be significantly reduced due to the relatively large reduction in fluid motion.

The shaft assembly 302 includes a first shaft 318 and second shaft 320. The first shaft 318 is fixedly coupled at one axial end 322 to a suitable system component such as the housing 202, shown in FIG. 2. Likewise, the second shaft 320 is fixedly coupled at one axial end 324 to a suitable system component (e.g., the housing 202 shown in FIG. 2). Thus, in the embodiment shown in FIG. 3, the first and second shafts 318 and 320 are formed as cantilever shafts. However, as previously mentioned, the sleeve may be fixedly attached to the housing at opposing axial ends in embodiments where the shaft assembly rotates and the sleeve assembly remains substantially stationary during system use.

The hydrodynamic bearing system 205 includes a plurality of bearings including fluid interfaces 326 (e.g., liquid metal interfaces) between outer surfaces 328 of the first and second shafts 318 and 320 and interior surfaces 330 of the sleeve assembly 304. To elaborate, the system includes a first journal bearing 332, a second journal bearing 334, a first thrust bearing 336, and a second thrust bearing 338, in the illustrated embodiment. However, other bearing arrangements have been envisioned such as bearing arrangements including two journal bearing and one thrust bearing, in one example, or a bearing arrangement including more than two journal bearing and/or more than two thrust bearings, in other examples. The journal bearings support radial loads and the thrust bearings support axial loads. Each of the bearings includes a fluidic interface (e.g., liquid metal interface) between a section of a shaft included in the shaft assembly 302 and the sleeve body 310. Thus, each of the bearings include a fluid interface circumferentially surrounding the corresponding shaft. The first journal bearing 332 includes a first fluid interface 370, the second journal bearing 334 includes a second fluid interface 372, the first thrust bearing 336 includes a third fluid interface 374, and the second thrust bearing 338 includes a fourth fluid interface 376.

The first shaft 318 and the second shaft 320 are shown with herringbone grooves 340 associated with the first journal bearing 332 and the second journal bearing 334, respectively. The sleeve assembly 304 may correspondingly include spiral grooves associated with the first and second journal bearings 332, 334. These grooves (herringbone and spiral grooves) may work in conjunction to generate pressure in the working fluid (e.g., liquid metal) to support the bearing load. It will therefore be understood that the bearings described herein may be self-acting bearings designed to generate pressure using the surface geometries at the bearing interface. However, bearing embodiments including alternate groove patterns or embodiments omitting at least a portion of the grooves to alter the bearing's flow dynamics, have been contemplated.

The first thrust bearing 336 includes a flange 342 radially extending from a body 344 of the first shaft 318 toward a complimentary section 346 in the sleeve body 310. The second thrust bearing 338 correspondingly includes a flange 348 radially protruding from the second shaft 320 into a complimentary section 350 in the sleeve body 310. The flanges 342, 348 have radial ends 352 and axial sides 354 which may form an annular shape, in some cases.

The hydrodynamic bearing system 300 may further include seals designed to reduce the amount of fluid leaking from the bearings. The seals may be rotating labyrinth seals providing a circuitous path impeding liquid metal flow in axial directions away from the cross-member 312. However, additional or alternate types of suitable seals or combinations of seals have been contemplated such as capillary seals, hydrodynamic seals, flange seals, foil seals, etc. The first seal 356 is shown positioned axially outward (indicated via arrow 358) from the first journal bearing 332. The second seal 360 is shown positioned axially outward (indicated via arrow 362) from the second journal bearing 334. The first seal 356 and the second seal 360 are also shown positioned radially outward from the first journal bearing 332 and the second journal bearing 334, respectively. However, an alternate number of seals and/or seal arrangement may be used, in other embodiments. The first and second thrust bearings 336 and 338 are shown positioned axially between the first and second journal bearings 332 and 334 and the first and second seals 356 and 360. However, in other examples, the first and/or second thrust bearings may be positioned adjacent to the unsupported axial ends of the first and second shafts 318 and 320. In such an example, the thrust bearing may be arranged with axially spacing between the unsupported shaft end and the cross-member to allow for thermal growth between the sleeve and the shaft. In this way, the likelihood of bearing wear caused by thermal expansion of system components can be reduced.

FIG. 4 shows another embodiment of a bearing system 400. The bearing system 400 again includes a sleeve assembly 402 and a shaft assembly 404. The shaft assembly 404 again includes a first shaft 406 and a second shaft 408 fixedly attached to a system component, such as the housing 202 shown in FIG. 2, at axial ends of the respective shafts. The hydrodynamic bearing system again includes a first journal bearing 410, a second journal bearing 412, a first thrust bearing 414, and a second thrust bearing 416. A first seal 418 and a second seal 420 are also shown included in the hydrodynamic bearing system 400. The shafts, bearing, and seals may have functional and/or structural similarities with the shafts, bearings, and/or seals previously described with regard to FIG. 3. As such, redundant description is omitted for brevity.

The sleeve assembly 400 shown in FIG. 4 includes a cross-member 422 with fluidic isolation extensions 424 (e.g., plugs, caps, etc.) and a flexible component 426. Thus, the extensions 424 seal the interior sleeve cavities. It will be understood that the flexible component has greater compliance than the sleeve sections 432 and 434. The fluidic isolation extensions 424 again fluidly divide the first interior cavity 428 and the second interior cavity 430. The extensions 424 may be welded, press-fit, mechanically coupled, etc., to the sections of the sleeve. It will be understood, that when the extensions are welded or press-fit to the sleeve a welded interface and friction interface, respectively, will be formed.

The flexible component 426 is positioned axially between the fluidic isolation extensions 424 as well as a first section 432 and a second section 434 of a sleeve body 436. The flexible component 426 also radially spans an interior diameter of an anode 438. However, other flexible component profiles have been envisioned and may be selected based on end-use design objectives. Additionally, the first section 432 of the sleeve body 436 and the second section 434 of the sleeve body are shown attached to the anode 438 axially extending across an outer circumference of the cross-member 422. However, alternate sleeve section arrangements may be utilized in other embodiments. For instance, in another example, a third sleeve body section may extend between the first section 432 and the second section 434 of the sleeve body 436 and circumferentially enclose the flexible component 426. Continuing with such an example, the anode 438 may be coupled to an outer surface of the third sleeve body section. The configuration and layout of the sleeve body sections may be selected based on packaging constraints, desired flexion characteristics, etc.

The flexible component 426 is configured as a compliant member accommodating for flexion between the first section 432 and the second section 434 of the sleeve body 436. Thus, the flexible component 426 may have less bending stiffness than the first sleeve section 432 and the second sleeve section 434. Further, in one example, the flexible component may be less compliant under torsional loads than bending loads. In this way, the flexible component may be relatively rotationally stiff but selectively compliant under bending loads. To elaborate, the flexible component 426 in the cross-member 422 conceptually functions as a gimbal without having the mechanical gyroscopic mechanisms. The use of the flexible component in the cross-member consequently decreases sleeve-shaft misalignment. The decreased sleeve-shaft misalignment allows the thickness of the fluid interfaces in the first and second journal bearings 410 and 412 to be reduced, increasing the load carry capacity of the bearings and bearing efficiency, if wanted. Consequently, the sleeve can achieve increased rotational speeds, if desired, during use of the x-ray source, thereby increasing the applicability of the bearing system. As such, in the CT imaging system use-case, higher rotational speed of the gantry of the CT imaging system can be realized, if desired.

The compliance of the flexible component 426 in the cross-member 422 may be achieved by adjusting the geometry and/or material of the flexible component. For instance, in one use-case example, the flexible component may be formed as a slotted spring structure. In another use-case example, selected walls of the cross-member may be thinned to achieve a desired amount of cross-member flexion suiting end-use design goals. In another use-case example, a more flexible alloy may be selected for the material construction of the flexible component of the cross-member when compared to the sleeve body. Still further in other use-case examples, a combination of geometric profiling (e.g., structural wall thinning) and cross-member material construction may be jointly used to achieve compliance objectives. It will be understood, that the amount of cross-member compliance may be selected based on design parameters such as an expected range of speeds of the anode, expected operating temperature range, shaft diameter, sleeve diameter, liquid metal film thickness, etc.

FIG. 5 shows a method 500 for operation of a hydrodynamic bearing system. The method 500 as well as the other control strategies described herein may be implemented by any of the systems, assemblies, components, devices, etc., described above with regard to FIGS. 1-4. However, in other examples, the method 500 may be carried out by other suitable systems, assemblies, components, devices, etc. Instructions for carrying out method 500 and/or the other control strategies described herein may be at least partially executed by a processor based on instructions stored in memory (e.g., non-transitory memory).

At 502, the method includes determining system operating conditions. The operating conditions may include x-ray beam intensity, x-ray beam duration, etc. Next at 504, the method includes rotating the sleeve assembly based on the system operating conditions. It will be appreciated that due to the fixed axial boundary conditions and cantilever shaft design the system may achieve a higher load carrying capacity and increased ability to resist leaks than previous bearing designs.

A technical effect of providing a cross-member in a sleeve of a hydrodynamic bearing system which fluidly separates cavities housing discrete shafts is to increase fluid stability in the bearing system to reduce fluid leaks, during for example, handling, processing, and/or use of the system.

In another representation, an x-ray tube with a straddle liquid metal bearing assembly is provided. The straddle liquid metal bearing assembly includes a sleeve with an anode coupled thereto, designed to rotate, and including an extension fluidly isolating a first interior opening from a second interior opening, where the first and second interior openings enclose portions of two discrete cantilever shafts and where each of the shafts are fixedly coupled to a stationary component.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features. As described herein "approximately" and "substantially" refer to values of within plus or minus five percent, unless otherwise noted.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A hydrodynamic bearing system comprising:
    a sleeve assembly including a cross-member fluidically dividing a first interior cavity from a second interior cavity;
    a first shaft positioned in the first interior cavity;
    a second shaft positioned in the second interior cavity;
    a first journal bearing including a first fluid interface surrounding at least a portion of the first shaft and configured to support radial loads; and
    a second journal bearing including a second fluid interface surrounding at least a portion of the second shaft and configured to support radial loads,
        wherein the cross-member includes a flexible component configured to accommodate for flexion between a first sleeve section including the first interior cavity and a second sleeve section including the second interior cavity.

2. The hydrodynamic bearing system of claim 1, where the sleeve assembly is configured to rotate and includes an anode coupled thereto and where the first and second shafts are stationary and are formed as cantilever shafts.

3. The hydrodynamic bearing system of claim 1, where the flexible component is formed from a different material than the first sleeve section and the second sleeve section.

4. The hydrodynamic bearing system of claim 1, further comprising a first thrust bearing including a first flange in the first shaft positioned axially outward from the first journal bearing.

5. The hydrodynamic bearing system of claim 4, further comprising a second thrust bearing including a second flange in the second shaft positioned axially outward from the second journal bearing.

6. The hydrodynamic bearing system of claim 1, further comprising a first rotating seal formed between the first shaft and the first interior cavity and a second rotating seal formed between the second shaft and the second interior cavity.

7. The hydrodynamic bearing system of claim 1, where the first interior cavity is a first blind opening in a monolithic sleeve body and the second interior cavity is a second blind opening in the monolithic sleeve body.

8. The hydrodynamic bearing system of claim 1, where the cross-member includes a first extension fluidly sealing an axial end of the first interior cavity and a second extension fluidly sealing an axial end of the second interior cavity.

9. The hydrodynamic bearing system of claim 8, where the first extension is welded or press-fit into the first interior cavity and the second extension is welded or press-fit into the second interior cavity.

10. The hydrodynamic bearing system of claim 8, where the flexible component extends radially between the first extension and the second extension.

11. The hydrodynamic bearing system of claim 10, where the hydrodynamic bearing system further comprises an anode coupled to and extending around the first sleeve section and the second sleeve section.

12. A method for operation of a hydrodynamic bearing system, comprising:
    rotating a sleeve assembly;
    where the sleeve assembly includes a cross-member fluidically dividing a first interior cavity from a second interior cavity;
    where a first shaft is positioned in the first interior cavity;
    where a second shaft is positioned in the second interior cavity; and
    where the hydrodynamic bearing system includes:
        a first journal bearing including a first fluid interface surrounding a portion of the first shaft and configured to support radial loads; and
        a second journal bearing including a second fluid interface surrounding a portion of the second shaft and configured to support radial loads
            wherein the cross-member includes a flexible component configured to accommodate for flexion between a first sleeve section including the first interior cavity and a second sleeve section including the second interior cavity.

13. The method of claim 12, where the sleeve assembly is rotated and includes an anode coupled thereto and where the first shaft and the second shaft are formed as cantilever shafts.

14. A liquid metal bearing system comprising:
    a sleeve assembly having an anode coupled thereto and including a cross-member providing a fixed axial fluid boundary condition at an axial end of each of a first interior cavity and a second interior cavity;
    a first cantilever shaft positioned in the first interior cavity;
    a second cantilever shaft positioned in the second interior cavity;
    a first journal bearing including a first fluid interface between the first cantilever shaft and the first interior cavity;
    a second journal bearing including a second fluid interface between the second cantilever shaft and the second interior cavity; and
    a first thrust bearing including a first flange in the first cantilever shaft.

15. The liquid metal bearing system of claim 14, further comprising a second thrust bearing including a second flange in the second cantilever shaft.

16. The liquid metal bearing system of claim 15, further comprising a first rotating seal formed between the first cantilever shaft and the first interior cavity and positioned axially outward from the first journal bearing and the first thrust bearing and a second rotating seal formed between the second cantilever shaft and the second interior cavity and positioned axially outward from the second journal bearing and the second thrust bearing.

17. The liquid metal bearing system of claim 14, where the cross-member includes a flexible component having less bending stiffness than a first sleeve section including the first interior cavity and a second sleeve section including the second interior cavity.

18. The liquid metal bearing system of claim 17, where the anode circumferentially surrounds the flexible component.

* * * * *